United States Patent
Cao et al.

(10) Patent No.: US 11,629,758 B2
(45) Date of Patent: Apr. 18, 2023

(54) METHOD FOR PACKING ROLLING ELEMENTS IN BEARING, AND USE THEREOF

(71) Applicant: Aktiebolaget SKF, Gothenburg (SE)

(72) Inventors: Keqiang Cao, Shanghai (CN); Zhiqiang Zhao, Shaoxing (CN); Meng Zhang, Shanghai (CN); Qiang Li, Shaoxing (CN); Shan Zhang, Hanzhong (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/485,439

(22) Filed: Sep. 26, 2021

(65) Prior Publication Data
US 2022/0128097 A1    Apr. 28, 2022

(30) Foreign Application Priority Data

Oct. 23, 2020 (CN) .......................... 202011145302.X

(51) Int. Cl.
*F16C 43/08*    (2006.01)

(52) U.S. Cl.
CPC .................................. *F16C 43/086* (2013.01)

(58) Field of Classification Search
CPC ........ F16C 43/06; F16C 43/08; F16C 43/086; Y10T 29/4968; Y10T 29/49682
USPC .......................... 29/898.06, 898.061, 898.062
See application file for complete search history.

(56) References Cited

U.S. PATENT DOCUMENTS

| | | | | |
|---|---|---|---|---|
| 2,885,767 A | * | 5/1959 | Barish | F16C 43/08 29/898.062 |
| 2,952,900 A | * | 9/1960 | Glavan | F16C 23/084 29/898.07 |
| 3,783,482 A | * | 1/1974 | Kunert | F16C 43/08 29/898.062 |

FOREIGN PATENT DOCUMENTS

| | | | |
|---|---|---|---|
| CN | 113007228 | * | 6/2021 |
| JP | 2006-177507 | * | 7/2006 |

OTHER PUBLICATIONS

Translation of CN 113007228, Jun. 2021.*

* cited by examiner

*Primary Examiner* — James Pilkington
(74) *Attorney, Agent, or Firm* — Garcia-Zamor Intellectual Property Law, LLC; Ruy Garcia-Zamor

(57) ABSTRACT

A method for packing rolling elements in a bearing providing using a bearing ring fixing component to fix a first bearing ring, preventing it from shifting when subjected to radial compression; inserting two first packing supports between a first bearing ring raceway and a second bearing ring raceway at a predetermined circumferential angle, the two first packing supports dividing the bearing in a circumferential range into a compression zone lying and a warping zone lying outside the range of the circumferential angle; and using a bearing ring compression component to apply a compressive load to a circumferential portion of the second bearing ring. The compressive load directed towards the first bearing ring in a radial direction, to force a radial gap between the first bearing ring raceway and second bearing ring raceway to decrease, such that a window suitable for packing the rolling elements is formed in the warping zone.

10 Claims, 3 Drawing Sheets

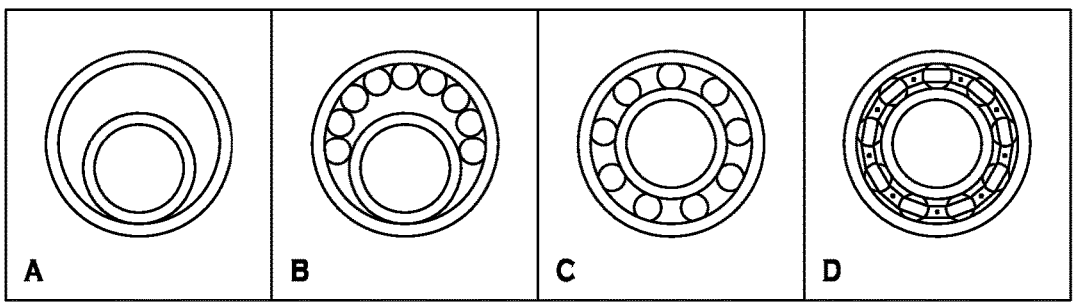
FIG. 1
PRIOR ART
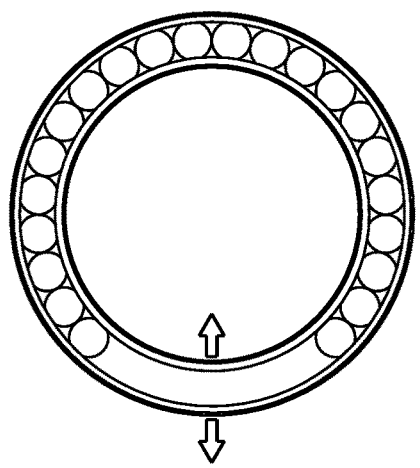
FIG. 2
PRIOR ART
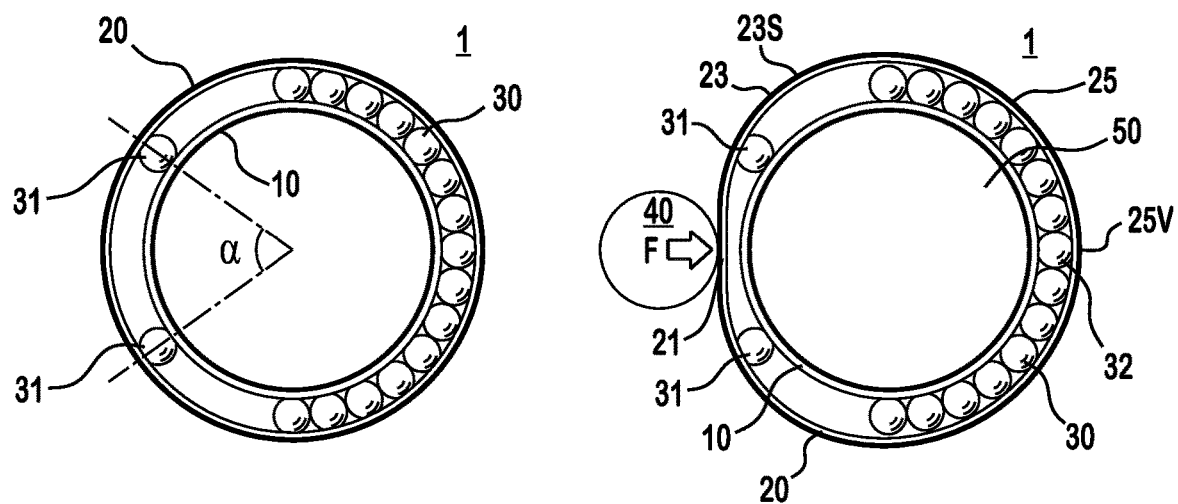
FIG. 3A  FIG. 3B

METHOD FOR PACKING ROLLING ELEMENTS IN BEARING, AND USE THEREOF

CROSS-REFERENCE TO RELATED APPLICATIONS

This application claims priority to Chinese Patent Application no. 202011145302.X, filed Oct. 23, 2020, the contents of which is fully incorporated herein by reference.

TECHNICAL FIELD

The present invention relates to a method and device for packing rolling elements between inner and outer ring raceways of a bearing, and a bearing formed by packing rolling elements using the method and/or device.

BACKGROUND OF THE INVENTION

Rolling element packing is a key process in bearing assembly. The Prior Art assembly method, as shown in FIG. 1, comprises the following steps: A) firstly, the inner ring is placed against one side of the outer ring in a radial direction; B) rolling elements are then packed in the empty region between the inner and outer rings; C) the inner ring is then moved to the centre of the bearing, and the rolling elements are evenly distributed between the inner and outer rings; D) finally, the cage is fitted as required. It can be seen from step B) that the empty region available for packing the rolling elements has a limited distribution in the circumferential range, and the corresponding circumferential angle (defined as the "loading angle") generally does not exceed 180-200 degrees. The loading angle within this range restricts the use of the Prior Art assembly method, and struggles in particular to meet the needs of heavy-duty bearings in which the rolling elements are distributed relatively close together.

In practice, rolling elements which cannot be packed in by the Prior Art assembly method are fitted by forcibly expanding the gap between the inner and outer rings, as shown in FIG. 2. However, forced assembly is extremely likely to cause plastic deformation of the inner and outer rings, not only altering the properties of the material and the stress distribution, but also being likely to cause scratching to the surface of the rolling components, and has therefore become a potential cause of premature bearing failure. Reality calls for a rolling element fitting method that is more effective but will not damage the bearing.

SUMMARY OF THE INVENTION

To solve the abovementioned problem, the present invention provides a method for packing rolling elements in a bearing, the method comprising the following operations: using a bearing ring fixing component to fix a first bearing ring, preventing it from shifting when subjected to radial compression; inserting two first packing supports between a raceway of the first bearing ring and a raceway of a second bearing ring at a predetermined circumferential angle, the two first packing supports dividing the bearing in a circumferential range into a compression zone lying within the range of the circumferential angle and a warping zone lying outside the range of the circumferential angle; and using a bearing ring compression component to apply a compressive load to a circumferential portion of the second bearing ring that lies in the compression zone, the compressive load being directed towards the first bearing ring in a radial direction, to force a radial gap between the first bearing ring raceway and second bearing ring raceway in the compression zone to decrease, such that a window suitable for packing the rolling elements is formed in the warping zone.

Based on the method described above, the present invention further provides a device for packing rolling elements in a bearing, and a bearing formed by packing rolling elements using the method and/or device; see the description below for details of the particular solutions.

The use of the method and device described above to pack the rolling elements can greatly reduce potential damage caused to bearings by an existing assembly operation, so has major practical significance and broad application prospects.

Various embodiments and beneficial effects of the present invention are described in detail below in conjunction with the drawings.

BRIEF DESCRIPTION OF THE DRAWINGS

FIG. 1 is a schematic diagram of the assembly process of the Prior Art assembly method.

FIG. 2 is a schematic diagram of a method of packing rolling elements by forcibly expanding the gap between inner and outer rings.

FIGS. 3A and 3B show schematic diagrams of the method of the present invention for packing rolling elements by compressing the bearing outer ring.

DETAILED DESCRIPTION OF THE INVENTION

Figure 4A:
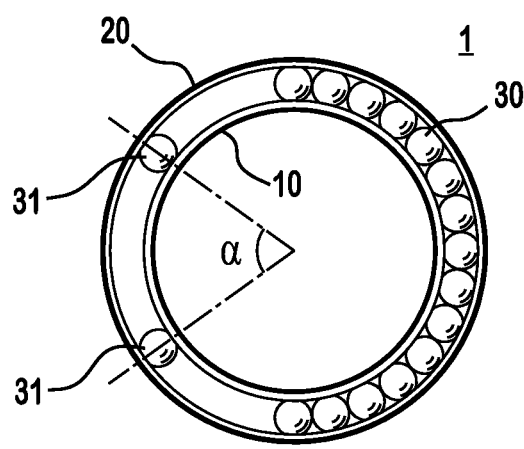
FIGS. 4A and 4B show schematic diagrams of the method of the present invention for packing rolling elements by compressing the bearing inner ring.

FIG. 3A shows a schematic diagram of a bearing partially packed with rolling elements. The bearing 1 comprises an inner ring 10 and an outer ring 20, from the inside to the outside in a radial direction. The inner ring is provided with an inner ring raceway at a radially outer side thereof; the outer ring is provided with an outer ring raceway at a radially inner side thereof. In a running state, rolling elements 30 can roll between the inner ring raceway and outer ring raceway. The rolling elements are generally further equipped with a cage (not shown), for ensuring that the rolling elements are evenly distributed around the circumference, to prevent them from touching and rubbing against each other.

FIG. 3B shows a schematic diagram of the principle of the present invention whereby the outer ring of the bearing is compressed to create a "window" required for packing the rolling elements. In a first embodiment of the present invention, firstly, an inner ring fixing component 50 is used to fix the inner ring 10, wherein the inner ring fixing component 50 may for example be a cylindrical boss with the same diameter as the inner ring 10, and is nested in the inner ring from a radially inner side, for the purpose of preventing radial movement of the inner ring under the action of an external force; two rolling elements 30 used as first packing supports 31 are then fitted between the inner and outer ring raceways at a predetermined circumferential angle α, and free movement of these two rolling elements in the circumferential direction is restricted; finally, a bearing ring compression component 40 is used to apply a compressive load F to a circumferential portion 21 of the outer ring 20 between the two rolling elements 31, the compressive load being directed towards the inner ring 10 in a radial direction, such that the circumferential portion 21 of the outer ring experiences elastic deformation.

It can be seen from FIG. 3B that in a compression zone defined by the two packing supports 31, the radial distance gap between the inner and outer ring raceways is obviously reduced, whereas in a region (called a "warping zone" hereinbelow) outside the compression zone defined by the two packing supports 31, under the action of a lever mechanism, the outer ring 20 first expands outwards radially to form an outer ring expansion zone 23, and then constricts inwards radially to form an outer ring constriction zone 25. In the present embodiment, since the inner ring 10 is supported by the cylindrical boss 50 of the same size, circumferential deformation of the inner ring can be ignored. Thus, as a result of the action of the compressive load F, the radial gap between the inner and outer ring tracks will reach a maximum value in a peak value zone 23S in the outer ring expansion zone 23. Supposing that deformation of the outer ring 20 in the compression zone is sufficiently large, then the maximum value thereof in the peak value zone 23S will exceed the diameter of the rolling elements significantly, thereby forming an optimal window for packing the rolling elements in the vicinity of the peak value zone 23S.

In the constriction zone 25 of the outer ring, the radial gap between the inner and outer ring raceways will gradually decrease until it reaches a minimum value in a trough value zone 25V; the trough value zone 25V is formed at the other side of the circumference, opposite the compression zone. It is not difficult to understand that the rolling elements 30 entering the constriction zone 25 from the packing window will be hindered by the ever-narrowing raceway gap and thus advance with difficulty, with the result that the rolling elements which enter first will obstruct the advance of the rolling elements which enter later, thereby making it difficult to fit the rolling elements. For this reason, in the present invention at least one rolling element is preferably arranged close to the trough value zone 25V as a second packing support 32, in order to hold open the raceway gap at the narrow section, and "expand" the channel for subsequently entering rolling elements.

An embodiment has been described above in which a compressive load F is applied by means of the bearing ring compression component 40 to the circumferential portion 21 of the outer ring 20 that lies in the compression zone, with the inner ring 10 fixed, thereby creating in the warping zone a window for packing the rolling elements. The first packing support 31 and second packing support 32 are both implemented as being embodied by rolling elements 30. This solution has the advantage that once all of the rolling elements have been packed, the rolling elements that were used as packing supports can be directly retained in the bearing, and need not be taken out.

Another option is that the first and second packing supports 31 and 32 can also be formed by special auxiliary components. Taking the first packing supports 31 as an example, the main function thereof is to provide boundary fulcrums for the compression zone, for the purpose of inducing deformation of the bearing ring in the warping zone, and thus can absolutely be realized by other auxiliary components. For example, the first packing supports 31 can be embodied by rolling elements of a slightly smaller size. This will not only increase the raceway gap in the warping zone, thereby eliminating the problem of the advance of the rolling elements being hindered in the constriction zone, but also, once all of the rolling elements have been fitted, the rolling elements of slightly smaller size can come out from between the inner and outer ring raceways naturally.

Figure 4B:
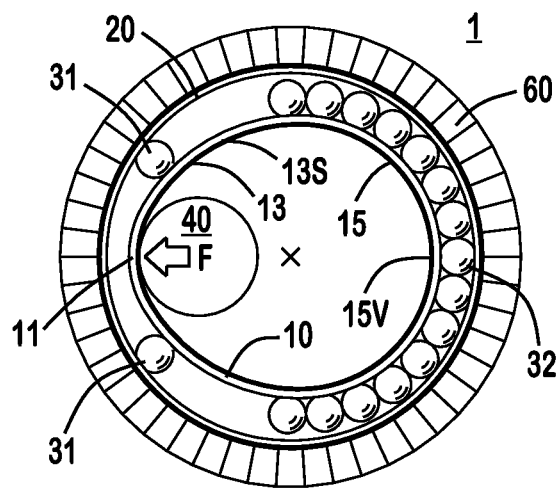

A second embodiment of the present invention is described below, now referring to FIGS. 4A and 4B; specifically, with the outer ring 20 fixed, a radially directed compressive load F is applied by means of a bearing ring compression component 40 to a circumferential portion 11 of the inner ring 10 that lies in a compression zone, thereby forming a window for packing the rolling elements 30 in a warping zone of the inner ring 10. The outer ring 20 is fixed by means of an outer ring fixing component 60. The outer ring fixing component 60 may for example be an annular structure fitted round the periphery of the outer ring in a radial direction, for the purpose of preventing the outer ring from moving in a radial direction when the inner ring is subjected to compression.

Specifically, under the action of a lever mechanism, the inner ring 10 will first of all constrict inwards in a radial direction in a warping zone to form an inner ring constriction zone 13, and then expand outwards in a radial direction to form an inner ring expansion zone 15. Since the outer ring 20 is restricted by the annular fixing component 60 of comparable size, circumferential deformation of the outer ring can be ignored. Thus, as a result of the action of the compressive load F, the radial gap between the inner and outer ring tracks will reach a maximum value in a peak value zone 13S in the inner ring constriction zone 13, and reach a minimum value in a trough value zone 15V in the inner ring expansion zone 15. Supposing deformation of the inner ring 10 in the compression zone is sufficiently large, then the maximum value of the gap between the inner and outer ring tracks will exceed the diameter of the rolling elements, thereby forming an optimal window for fitting the rolling elements in the vicinity of the peak value zone 13S.

Figure 5A:
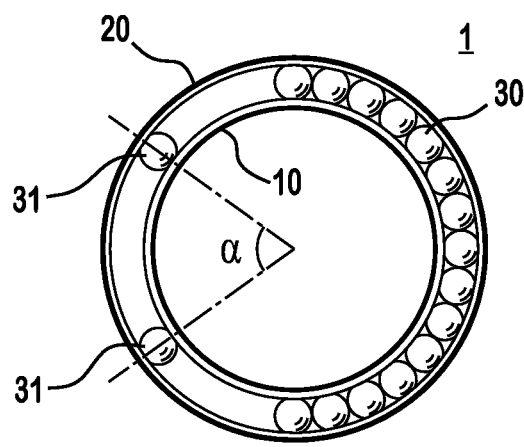
FIGS. 5A and 5B show schematic diagrams of the method of the present invention for packing rolling elements by simultaneously compressing the inner ring and outer ring of the bearing.
Figure 5B:
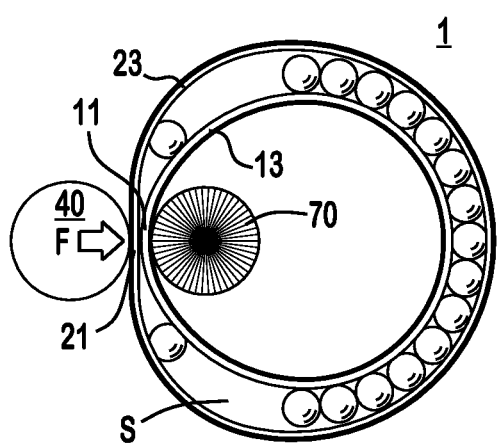

In a third embodiment of the present invention, as shown in FIG. 5B, bidirectional compressive loads F of equal size but opposite directions are applied simultaneously to an outer ring circumferential portion 21 and an inner ring circumferential portion 11 in a compression zone, such that an outer ring expansion part 23 expands outwards radially while an inner ring constriction part 13 also constricts inwards radially. In this case, the outer ring expansion part 23 and inner ring constriction part 13 both contribute to the increase in the radial gap therebetween, so compared with the scenario in the embodiments above where only one of the inner and outer rings is compressed, the compressive load F needed to form the packing window is smaller, and is unlikely to exceed the limits of elastic deformation of the inner and outer rings; thus, adverse effects on material properties and bearing performance can be avoided to the maximum extent.

In the present invention, the so-called bidirectional compression can be achieved by arranging an abutment component 70 in the compression zone of the inner ring or outer ring. In the embodiment shown in FIG. 5B, the abutment component 70 is designed to abut, from a radially inner side, a circumferential portion 11 of the inner ring 10 that lies in the compression zone. When a circumferential portion 21 of the outer ring 20 in the compression zone is acted on by a compressive load F of the bearing ring compression component 40 that is directed towards the inner ring 10 in a radial direction, the abutment component 70 also applies a reaction force, of equal magnitude but opposite direction, to the circumferential portion 11 of the inner ring 10 that lies in the compression zone, thereby not only fixing and supporting the inner ring 10 but also applying reciprocal compression to the circumferential portion 11 of the inner ring 10 that lies in the compression zone.

It is not difficult to understand that the configuration of the abutment component 70 does not lose its generality. Another option is that the abutment component 70 can be configured to abut, from a radially outer side, the circumferential portion 21 of the outer ring 20 that lies in the compression zone, such that the circumferential portion 11 of the inner ring 10 that lies in the compression zone is acted on by a compressive load F of the bearing ring compression component 40 that is directed towards the outer ring 20 in a radial direction. For the sake of conciseness, the details of this solution will not be described further.

Figure 6:
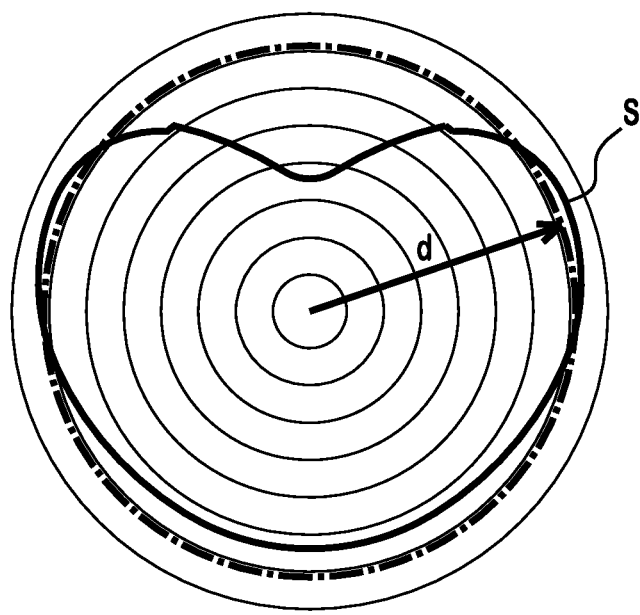
FIG. 6 is a diagram of the circumferential distribution of the radial gap between the inner and outer ring raceways, corresponding to the state of compression in FIG. 5B.

FIG. 6 is a diagram of the circumferential distribution of the gap between the inner and outer ring raceways, corresponding to the state of compression in FIG. 5B. It can be seen from the figure that the gap between the raceways substantially exhibits a heart-shaped distribution in the circumferential direction, with outside parts at the two shoulders exceeding the range of a standard circle representing the rolling element diameter d. Specifically, the gap between the raceways is smallest in the compression zone, is precisely equal to the rolling element diameter d at the edges of the compression zone (corresponding to the positions of the two supporting components 31), and reaches a maximum value in a peak value zone S of the warping zone. The maximum value exceeds the diameter of the rolling elements, so is suitable for forming the optimal window for packing the rolling elements.

Tests have demonstrated that the circumferential angle $\alpha$ of the compression zone is preferably between 60 and 90 degrees, and further preferably between 70 and 80 degrees. The circumferential angle within the abovementioned range can create a loading angle (the angle outside the circumferential angle $\alpha$ constitutes the loading angle) of 300 degrees at the most, fully meeting the requirements of the vast majority of heavy-duty bearings. Furthermore, a suitable circumferential angle $\alpha$ also allows the required packing window to be created in the warping zone by smaller deformation of the bearing ring in the compression zone, thereby avoiding the potential harm caused to the bearing ring by excessive deformation, although the optimal angular range is further dependent on factors such as bearing type, size and material properties.

A device 100 for packing bearing rolling elements according to the present invention is now described with reference to FIG. 7. The device 100 comprises a bearing loading platform 80, a bearing ring fixing component 70, a rolling element carrying ring 90, and a bearing ring compression component 40 for applying a compressive load F.

The bearing loading platform 80 substantially has a flat upper surface 81, for carrying the substantially horizontally-placed bearing inner ring 10 and bearing outer ring 20 in the process of assembly.

The bearing ring fixing component 70 is designed to be fixed to the loading platform 80, for the purpose of providing the radial support needed to fix the bearing ring. As stated above, the bearing ring fixing component may be a cylindrical boss 50 nested in the inner ring 10, or an annular structure 60 arranged around the outer ring 20 from a radially outer side. It is not difficult to understand that any form of fixing component can achieve the object of the present invention as long as it is able to position the bearing ring and prevent the bearing ring from shifting under radial compression.

Figure 7:
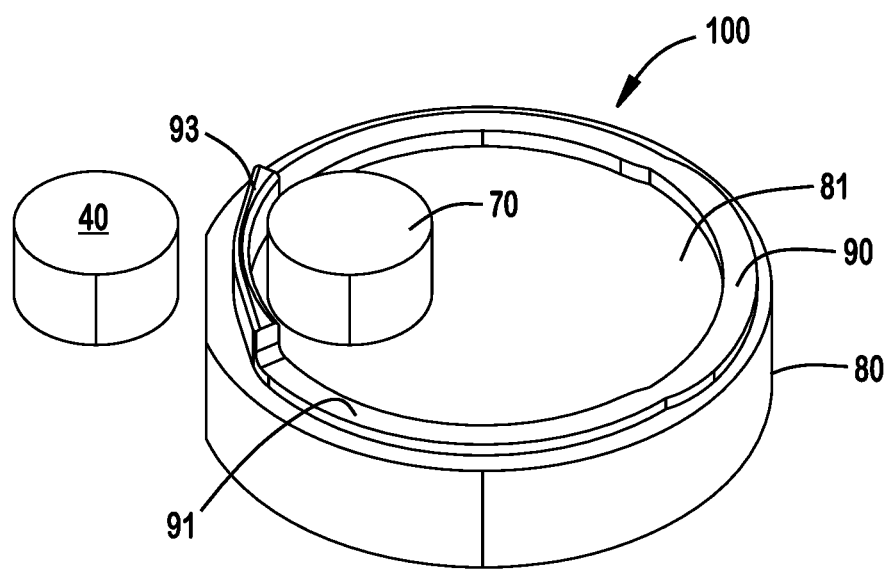
FIG. 7 shows the device of the present invention for packing rolling elements.

In the particular embodiment shown in FIG. 7, the bearing ring fixing component is formed by an abutment component 70. The abutment component 70 is designed to abut, from a radially inner side, a circumferential portion 11 of the inner ring 10 that lies in a compression zone, for the purpose of providing the radial support needed to resist the compressive load F of the bearing ring compression component 40 that acts on a circumferential portion 21 of the outer ring 20 in the compression zone.

The rolling element carrying ring 90 substantially has an annular structure, and is arranged between the inner and outer rings of the bearing during assembly, and therefore the radial size thereof is substantially the same as the diameter of a pitch circle (a circle formed by the rolling element centres) of the bearing; furthermore, the rolling element carrying ring comprises a lifting part 91 that corresponds circumferentially to a warping zone, and a blocking part 93 that corresponds to the compression zone. The axial height of the lifting part 91 is such that during assembly, it lifts the rolling elements 30 precisely to an axial position corresponding to the inner ring raceway and outer ring raceway, while the blocking part 93 can block any rolling element 30 from entering the region between the inner and outer ring raceways in the compression zone. In a preferred embodiment, the blocking part 93 is designed to have an axial size higher than the lifting part 91, thereby not only being able to block any rolling element 30 from entering the compression zone, but also forming limiting structures at two sides thereof, wherein the supporting components 31 can abut and remain at the limiting structures; this creates conditions for abutment and positioning of the first packing supports 31 at the two sides of the compression zone.

The bearing ring compression component 40 (see FIGS. 3-5) is configured, once the first packing supports 31 have been reliably positioned, to apply a compressive load F to the circumferential portion 21 of the outer ring 20 that lies in the compression zone, the compressive load being directed towards the inner ring 10 in a radial direction, thus forcing the maximum value of the gap between the raceways in the warping zone to exceed the diameter of the rolling elements 30, thereby forming an optimal window suitable for packing the rolling elements.

It can be seen from the above description that the bearing ring fixing component and bearing ring compression component are arranged symmetrically. Thus, another option is that the bearing ring fixing component can be used to fix the outer ring 20, while the compression component is used to compress the inner ring 10.

In a preferred embodiment, as shown in FIG. 7, the blocking part 93 has a smaller radial thickness at a substantially central portion thereof than at the two ends thereof, so as to avoid interference with the inner and outer rings when the compression zone deforms, thus facilitating the formation of the packing window.

It can be seen from the above description that using the method and device described above to pack the rolling elements can greatly reduce potential damage caused to bearings by an existing assembly operation, and can significantly reduce the factory output risk caused by improper assembly of bearings, thus having a major impact in terms of reducing the future failure rate of bearings. Thus, bearings assembled using the method and/or device described above should also fall within the scope of protection of the present invention.

The method and device of the present invention are not restricted by particular embodiments; more general technical solutions will be defined in the attached claims. Any changes or improvements to the present invention which comply with the definitions in the attached claims shall be included in the scope of protection of the present invention.

The invention claimed is:

1. A method for packing rolling elements in a bearing, the bearing comprising a first ring and a second ring, the rolling elements being rotatable between a first ring raceway formed on the first ring and a second ring raceway formed on the second ring after assembly, the method comprising the following operations:
   using a bearing ring fixing component to fix the first ring, preventing the first ring from shifting when subjected to radial compression;
   inserting two first packing supports between the first ring raceway and second ring raceway at a predetermined circumferential angle, the two first packing supports dividing the bearing in a circumferential range into a compression zone lying within the range of the circumferential angle and a warping zone lying outside the range of the circumferential angle; and
   using a bearing ring compression component to apply a compressive load to a circumferential portion of the second ring that lies in the compression zone, the compressive load being directed towards the first ring in a radial direction, to force a radial gap between the first ring raceway and second ring raceway in the compression zone to decrease so that a window formed in the warping zone has an opening larger than a diameter of the rolling elements.

2. The method according to claim 1, wherein the bearing ring fixing component is an abutment component that provides abutment support directed towards the second ring in the radial direction for a circumferential portion of the first ring in the compression zone, thereby forming a balance between an action force and a reaction force with the radial compressive load acting on the circumferential portion of the second ring that lies in the compression zone.

3. The method according to claim 2, wherein at least one second packing support is additionally provided in a trough value zone, the trough value zone being defined within the radial gap between the first ring raceway and second ring raceway diametrically opposite the compression zone.

4. The method according to claim 3, wherein the first packing supports and second packing support are each rolling elements of the bearing and are retained in the raceways after assisting with the packing of the other rolling elements of the bearing.

5. The method according to claim 4, wherein the circumferential angle is between 60 and 90 degrees.

6. A device for packing a plurality rolling elements in a bearing, the bearing having a first ring and a second ring, the first ring defining a first ring raceway and the second ring defining a second ring raceway, the first ring raceway and the second ring raceway being configured to receive a plurality of rolling elements therebetween such that the first ring is rotatable relative to the second ring when the plurality of rolling elements are located therebetween, the device comprising:
   a bearing loading platform configured to carry, during assembly of the first ring and the second ring thereon with the first ring and the second ring being positioned to lay flat on the bearing loading platform;
   a bearing ring fixing component is positioned on the bearing loading platform and is configured to position- ally fix the first ring and prevent the first ring from shifting when subjected to radial compression;
   a rolling element carrying ring having an annular structure and a radial size that is substantially the same as a pitch circle diameter of the bearing and is designed to lift the rolling elements to a corresponding axial position between the first ring raceway and second ring raceway; and
   a bearing ring compression component that is configured to apply a compressive load to a circumferential portion of the second ring that lies in a compression zone lying within a circumferential angle, the compressive load being configured to be directed towards the first ring in a radial direction, to force a radial gap between the first ring raceway and second ring raceway in the compression zone to decrease so that a window formed in a warping zone has an opening larger than a diameter of the rolling elements, the warping zone laying outside the circumferential angle of the compression zone.

7. The device according to claim 6, wherein the bearing ring fixing component comprises an abutment component, the abutment component being configured to apply abutment support directed towards the second ring in a radially outward direction and to a circumferential portion of the first ring that lies in the compression zone, thereby forming a balance between an action force and a reaction force, the compressive load providing the action force and the abutment support providing the reaction force.

8. The device according to claim 6, wherein the rolling element carrying ring further comprises a lifting part located circumferentially and configured for alignment with the warping zone and a blocking part configured for alignment with the compression zone, the lifting part being configured to lift the rolling elements to a corresponding axial position between the first ring raceway and second ring raceway, while the blocking part is configured to have a height different with the lifting part so that the an axial size of the blocking part is greater than that of the lifting part for the purpose of preventing any rolling elements from entering the region between the first ring raceway and the second ring raceway in the compression zone during assembly and to form a limiting structure between the lifting part and the blocking part.

9. The device according to claim 8 wherein the blocking part has a smaller radial thickness at a substantially central portion thereof than at two ends thereof so that the first ring and/or the second ring undergo greater compressive deformation in the compression zone.

10. A combination device for packing rolling elements in a bearing and a plurality of components of a bearing to be manufactured, the combination comprising:
   the plurality of components of the bearing including a first ring having a first ring raceway thereon and a second ring, having a second ring raceway thereon, the first ring raceway and the second ring raceway being configured to receive a plurality of rolling elements therebetween such that the first ring is rotatable relative to the second ring when the plurality of rolling elements are located therebetween,
   the device having a bearing loading platform for carrying, during assembly, the first ring and the second ring that are positioned thereon with an axis of rotation generally aligned perpendicularly to the bearing loading platform;
   a bearing ring fixing component is positioned on the bearing loading platform and is configured to positionally fix the first ring and prevent the first ring from shifting when subjected to radial compression;

two of the plurality of rolling elements form first packing supports disposed between the first ring raceway and second ring raceway at a predetermined circumferential angle, the two first packing supports dividing the bearing in a circumferential range into a compression zone lying within the range of the circumferential angle and a warping zone lying outside the range of the circumferential angle;

a rolling element carrying ring having an annular structure and a radial size that is substantially the same as a pitch circle diameter of the bearing and is designed to lift the rolling elements to a corresponding axial position between the first ring raceway and second ring raceway; and a bearing ring compression component that applies a compressive load to a circumferential portion of the second ring that lies in the compression zone, the compressive load being directed towards the first ring in a radial direction, to force a radial gap between the first ring raceway and second ring raceway in the compression zone to decrease so that a window formed in the warping zone has an opening larger than a diameter of the rolling elements.

* * * * *